United States Patent [19]

Ross

[11] Patent Number: 4,714,152
[45] Date of Patent: Dec. 22, 1987

[54] ACCUMULATOR

[75] Inventor: Graham J. Ross, Hingham, Mass.

[73] Assignee: Pneumatic Scale Corporation, Quincy, Mass.

[21] Appl. No.: 28,074

[22] Filed: Mar. 19, 1987

Related U.S. Application Data

[63] Continuation of Ser. No. 720,707, Apr. 8, 1985, abandoned.

[51] Int. Cl.$^4$ .............................................. B65G 1/00
[52] U.S. Cl. ................................... 198/347; 198/419; 198/429
[58] Field of Search ............... 198/347, 419, 429, 430; 414/37, 59, 89

[56] References Cited

U.S. PATENT DOCUMENTS

| | | | |
|---|---|---|---|
| 1,842,912 | 1/1932 | McNamara | 198/430 |
| 1,857,967 | 5/1932 | Lorenz | 198/429 |
| 2,071,859 | 2/1937 | Steiner | 198/433 |
| 2,304,905 | 12/1942 | Gantzer | 198/463.4 |
| 2,910,167 | 10/1959 | Phin | 198/456 |
| 2,951,574 | 9/1960 | Craig | 198/433 |
| 3,040,867 | 6/1962 | Posten et al. | 198/430 |
| 3,204,752 | 9/1965 | Conner | 198/429 |
| 3,308,922 | 3/1967 | Ellis et al. | 198/433 |
| 3,360,100 | 12/1967 | Seragnoli | 198/347 |
| 3,450,246 | 6/1969 | Seragnoli | 198/347 |
| 3,470,996 | 10/1969 | Lee et al. | 198/347 |
| 3,532,387 | 10/1970 | Stancari | 198/347 |
| 3,570,685 | 3/1971 | Carlson | 414/59 |
| 3,664,087 | 5/1972 | Choate et al. | 414/89 |
| 3,669,241 | 6/1972 | Chalich | 198/347 |
| 3,960,266 | 6/1976 | Becker | 198/457 |
| 4,273,234 | 6/1981 | Bourgeois | 198/347 |
| 4,290,517 | 9/1981 | Hafferkamp | 198/430 |
| 4,339,028 | 7/1982 | Meade | 198/429 |
| 4,499,987 | 2/1985 | Long | 198/347 |
| 4,609,091 | 9/1986 | Dorner | 198/347 |
| 4,667,808 | 5/1987 | Mastak | 198/419 |

FOREIGN PATENT DOCUMENTS

| | | | |
|---|---|---|---|
| 2733823 | 2/1979 | Fed. Rep. of Germany | 198/430 |
| 529976 | 12/1940 | United Kingdom | 198/429 |

Primary Examiner—Joseph E. Valenza
Attorney, Agent, or Firm—Robert T. Gammons

[57] ABSTRACT

Apparatus comprising an accumulator for temporarily storing articles being transferred by a conveyor from one operation to another in the event that there is blockage of the articles at the discharge end of the conveyor and for restoring the articles to the conveyor when the blockage is dispersed including sensors and control circuitry for on the one hand transferring the articles from the conveyor to the accumulator and on the other hand transferring the articles from the accumulator to the conveyor.

10 Claims, 13 Drawing Figures

ACCUMULATOR

This is a continuation of application Ser. No. 720,707, filed on Apr. 8, 1985, now abandoned.

BACKGROUND OF THE INVENTION

Apparatus in the form of accumulators for temporarily storing articles traveling along on a conveyor from one operation to another in the event of blockage for one rason or another are known in the art, examples of which are disclosed in U.S. Pat. Nos. 1,609,802 and 3,470,996. The devices shown in the aforesaid patents stack the articles while in storage, which requires elevator means and elaborate loading and unloading mechanism. It is the purpose of this invention to provide an improved accumulator wherein the articles can be stored without stacking, thus avoiding the necessity for elaborate mechanism and the stacking of articles one upon another which can be damaging to the articles.

SUMMARY OF THE INVENTION

As herein illustrated, the apparatus comprises an accumulator arranged adjacent a conveyor defining an upper supporting surface in the plane of the conveyor at one side thereof with one end adjacent the conveyor and the other end remote therefrom, a dead plate positioned between the conveyor and the adjacent end of the accumulator, a stabilizer bar arranged above the dead plate for movement upwardly and downwardly relative thereto, a pusher bar arranged at the opposite side of the conveyor from the accumulator in confronting relation with the accumulator for movement toward and away from the conveyor and gates arranged at upstream and downstream sides of the accumulator in the path of travel of the conveyor and means for at times moving the accumulator toward the conveyor, reciprocating the stabilizer bar and reciprocating the pusher bar and control circuitry for sequencing the operation of the aforesaid means to on the one hand transfer articles from the conveyor to the accumulator and on the other hand to transfer articles from the accumulator to the conveyor. There are guide rails positional at opposite sides of the conveyor upstream and downstream of the accumulator and means for supporting the guide rails for vertical adjustment relative to the plane of the conveyor to accommodate articles of different vertical height. The guide rails comprise vertically-spaced upper and lower rails and the rails adjacent the accumulator are continuous and substantially parallel to the conveyor and at the side adjacent the pusher of two-part construction comprising a part substantially parallel to the conveyor and a part converging toward the conveyor in the direction of movement. The pusher bar corresponds substantially in length to the width of the accumulator and is supported at a level above the accumulator for rectilinear movement transversely of the conveyor. The gates may be star wheels or the equivalent mounted adjacent the upstream and downstream side of the accumulator above the plane of the conveyor provided with radial blades dimensioned to extend transversely of the conveyor. There is means for driving the conveyor at a speed relative to the processing machine upstream of the accumulator at a rate such that the articles are spaced at a predetermined spacing on the conveyor as they are transported thereby. There is kinematic means operable to move the pusher bar transversely of the conveyor during the loading mode to transfer articles from the conveyor to the dead plate and to retract the pusher bar simultaneously with indexing of the accumulator toward the conveyor to, in conjunction with the accumulator, stabilize the articles while being transferred from the dead plate to the conveyor. The stabilizer bar is yieldably mounted. There is a back stop mounted to the accumulator for stabilizing the articles removed from the dead plate onto the accumulator as the articles on the accumulator are moved by the cartons pushed from the dead plate. The control circuitry comprises first and second sensors downstream of the accumulator operable when blocked by articles downstream of the accumulator to lock the gate at the downstream side, third sensors operable when blocked by articles backed up against the locked gate to sequentially elevate the stabilizer bar, move the pusher bar transversely of the conveyor to transfer articles backed up against the locked gate from the conveyor to the dead plate and thereafter to lower the stabilizer bar into engagement with the articles transferred from the dead plate and retract the pusher bar. The circuitry is operable to repeat the aforesaid sequence so long as articles block the first sensor. The third sensors comprises sensors arranged upstream and downstream of the accumulator within the confines of the accumulator and a sensor positioned therebetween operable when cojointly blocked to initiate the aforesaid sequence. There is a terminal sensor adjacent the end of the accumulator remote from the conveyor operable to abort the loading operation of the accumulator. The second sensor is operable when the space between containers is greater than the predetermined spacing between containers to lock the gate at the upstream side of the accumulator and to release the gate at the downstream side. Fourth sensors are operable in the absence of articles on the conveyor confronting the accumulator to initiate sequential movement of the pusher bar transversely of the conveyor into engagement with the articles on the dead plate, raise the stabilizer bar to release the articles on the dead plate, simultaneously index the accumulator belt toward the dead plate and retracts the pusher bar to transfer a line of articles from the accumulator belt to the dead plate and a line of articles from the dead plate to the conveyor, lower the stabilizer bar into engagement with the articles transferred from the accumulator belt to the dead plate and a dead plate sensor operable in the absence of articles thereon to terminate the operation of the accumulator.

The apparatus will now be described in greater detail with reference to the accompanying drawings, wherein.

Figure 13:
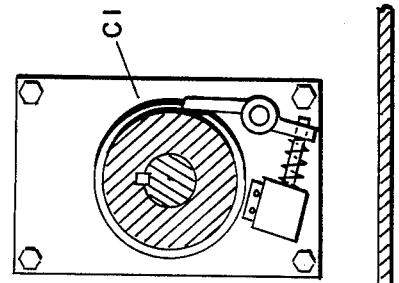
FIG. 13 is an elevation taken on the line 13—13 of FIG. 2.
Figure 12:
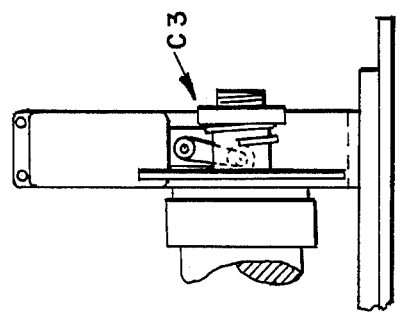
FIG. 12 is a section taken on the line 12—12 of FIG. 11.
Figure 1:
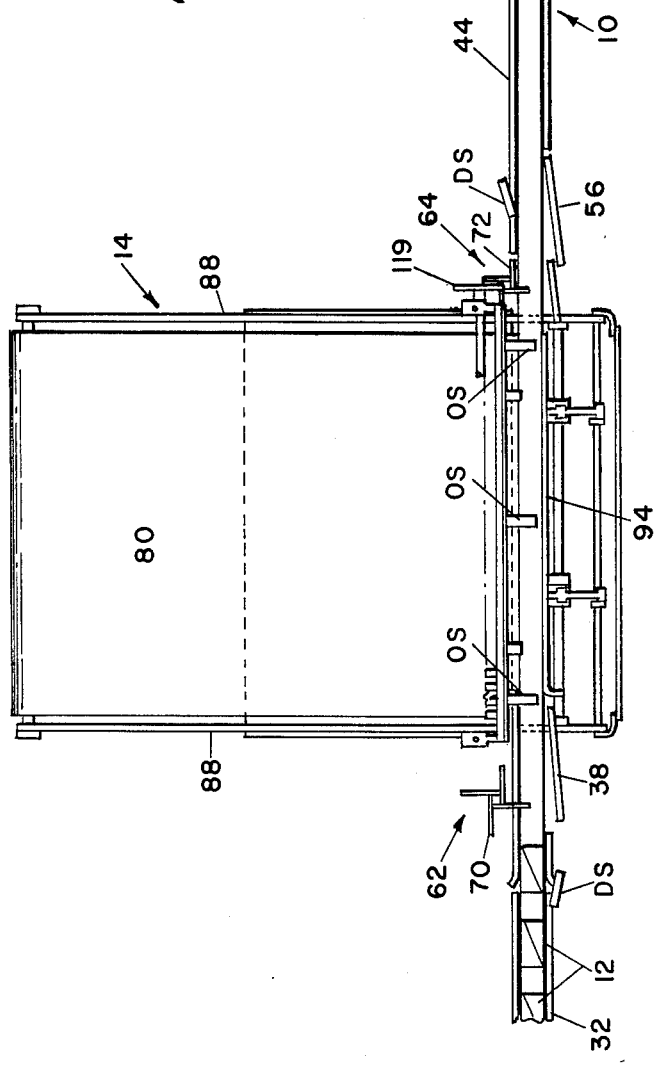
FIG. 1 is a plan view showing the accumulator disposed adjacent a conveyor between stations A and B, not specifically illustrated.

Referring to the drawings, FIG. 1, there are shown a conveyor 10 for transporting articles 12 such as cartons from a filling apparatus where product is deposited in the cartons to, for example, apparatus for closing and sealing the cartons, or to apparatus for depositing the cartons in shipping containers and an accumulator 14 positioned adjacent the conveyor between the apparatus for filling the cartons and the apparatus for depositing the cartons in containers operable for at times receiving cartons from the conveyor for temporary storage in the event that there is a blockage of cartons downstream thereof and restoring the cartons to the conveyor when the blockage is dissipated.

Figure 4:
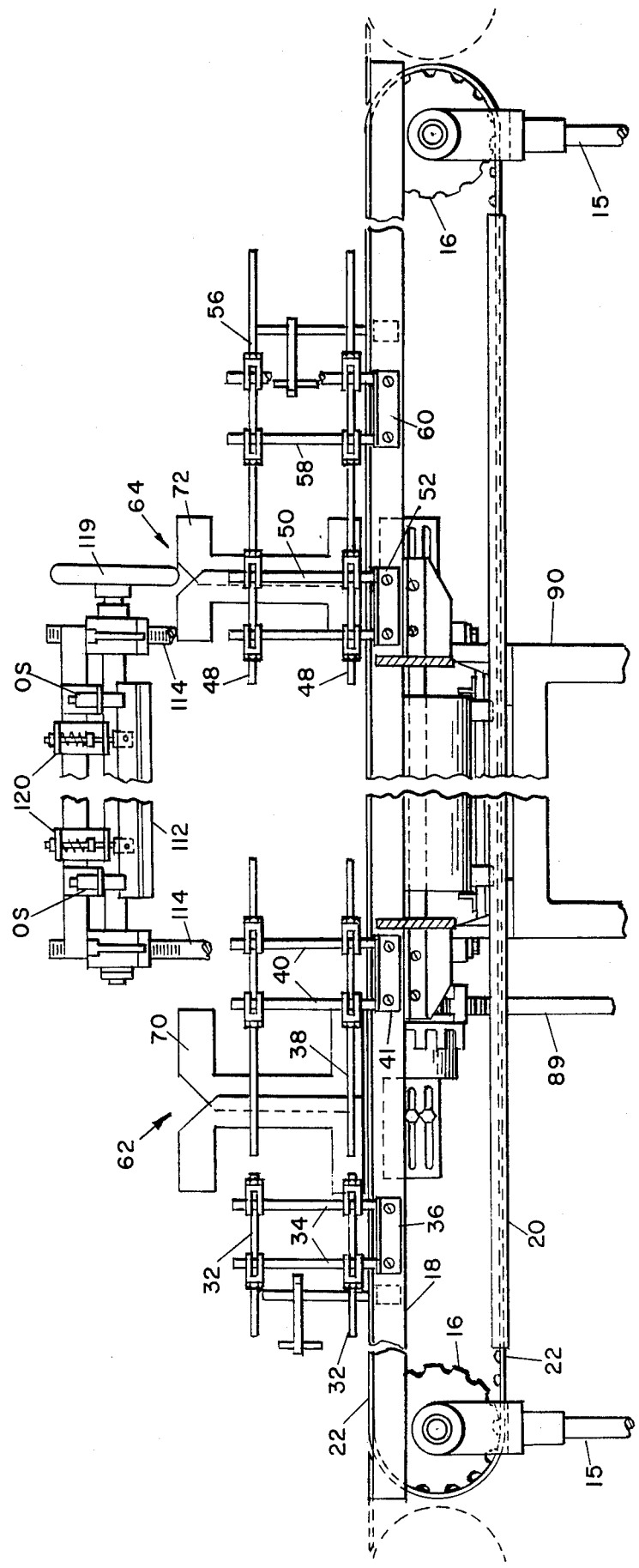
FIG. 4 is a front elevation of the apparatus including the conveyor and the accumulator.

The conveyor 10, FIG. 4, is mounted on a supporting structure 15 which includes sprockets 16—16 and comprises upper, horizontally-disposed rails 18 and lower horizontally-disposed rails 20 which support a belt conveyor 22 for linear movement of the upper run of the belt from left to right as herein illustrated. At the upstream side of the accumulator and the downstream side of the accumulator, there are guide rails, FIGS. 4 and 5. The guide rails at the upstream side, FIG. 5, comprise at the rear side vertically-spaced bars 23 mounted on posts 24 secured at their lower ends to bracket plates, not shown. The rails 23 are substantially parallel to the conveyor and at the ends adjacent the accumulator, have bent portions 30 generally at right angles to the conveyor. The guide rails at the forward side of the conveyor comprise, FIG. 4, vertically-spaced guide rails 32 mounted on posts 34, the lower ends of which are fixed to a bracket plate 36. The guide rails 32 are generally parallel to the guide rails 23. Additional guide rails 38 are supported by posts 40 fixed at their lower ends to brackets 41. The guide rails 38 extend forwardly from the guide rails 32 in the direction of movement of the conveyor at an angle converging with respect to the longitudinal center line of the conveyor. The forward ends of the guide rails 38 are substantially coterminous with the forward bent ends 30 of the guide rails 23. At the downstream side of the accumulator, there are vertically-spaced guide rails 42 at the rear side supported on posts 44, the lower ends of which are fixed to brackets 46, not shown. At the forward side of the conveyor, there are guide rails 48 supported by posts 50 fixed at their lower ends to a bracket 52 and guide rails 56 secured to posts 58, the lower ends of which are fixed to a bracket 60. The guide rails 48 and 56 converge with respect to the conveyor in the direction of movement thereof. The guide rails as described are mounted to the posts for vertical adjustment thereon.

The conveyor belt 22 is entrained at its opposite ends about the sprockets 16—16, FIG. 4, and the latter are driven by sutiable kinematic means connected to a motor, not shown. The conveyor belt 22 is driven at a constant rate at a speed to distribute the articles at a predetermined, spaced-apart relation to each other.

Figure 5:
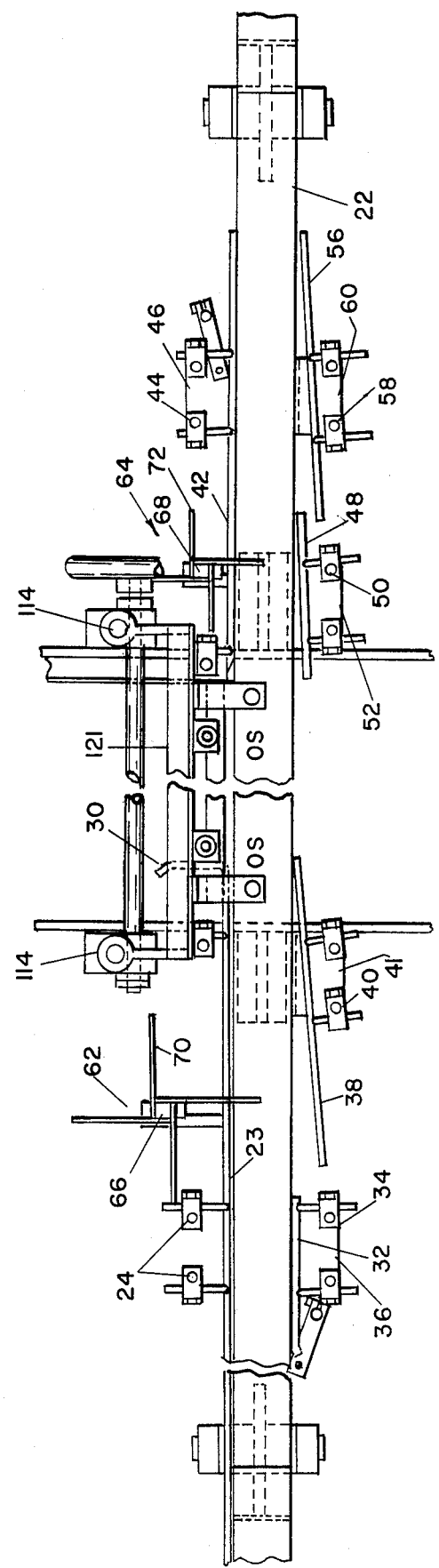
FIG. 5 is a plan view of the conveyor broken away in part.
Figure 8:
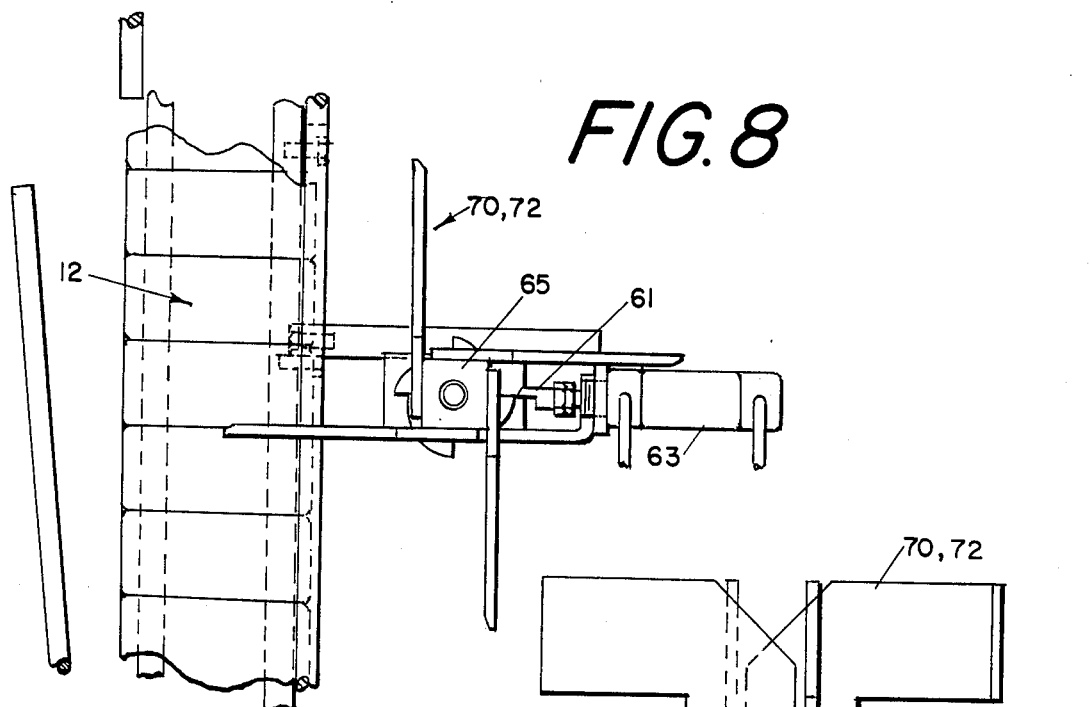
FIG. 8 is a fragmentary plan view of the conveyor showing one of the gates.
Figure 9:
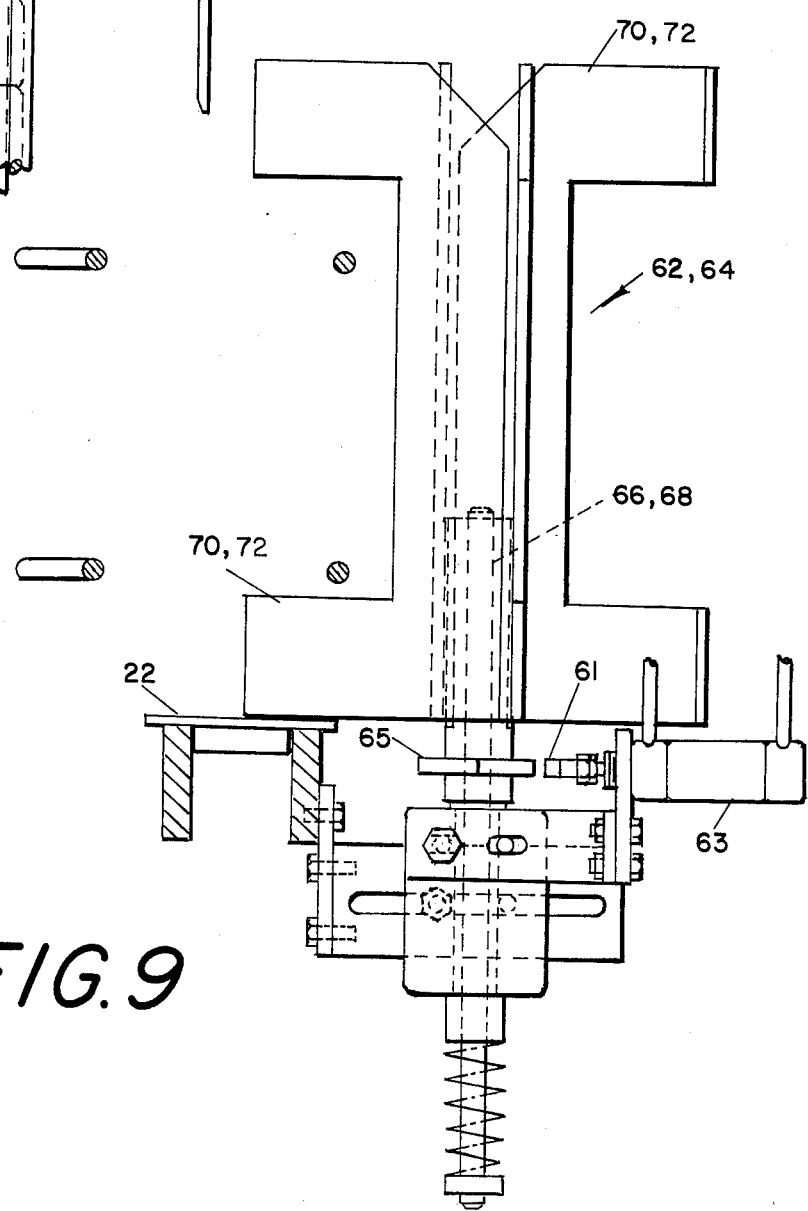
FIG. 9 is an elevation to larger scale of a gate.

At the upstream and downstream sides of the accumulator, FIG. 5, there are gates in the form of star wheels 62 and 64. The star wheels are mounted adjacent the conveyor on vertically-disposed shafts 66 and 68, FIGS. 8 and 9, and each comprises four right-angularly disposed blades 70 and 72 of such length as when disposed at right angles to the conveyor, to overlap the conveyor surface so as to be in a position to be engaged by articles moving along on the conveyor. As will appear hereinafter, the gates are at times free to turn as the articles are moved along by the conveyor and at other times are locked to prevent passage of articles. Locking of the gates is provided for by latches 61 arranged to be moved by air cylinders 63 into engagement with toothed wheels 65 fixed to the lower ends of the star wheel shafts, FIGS. 8 and 9.

Figure 2:
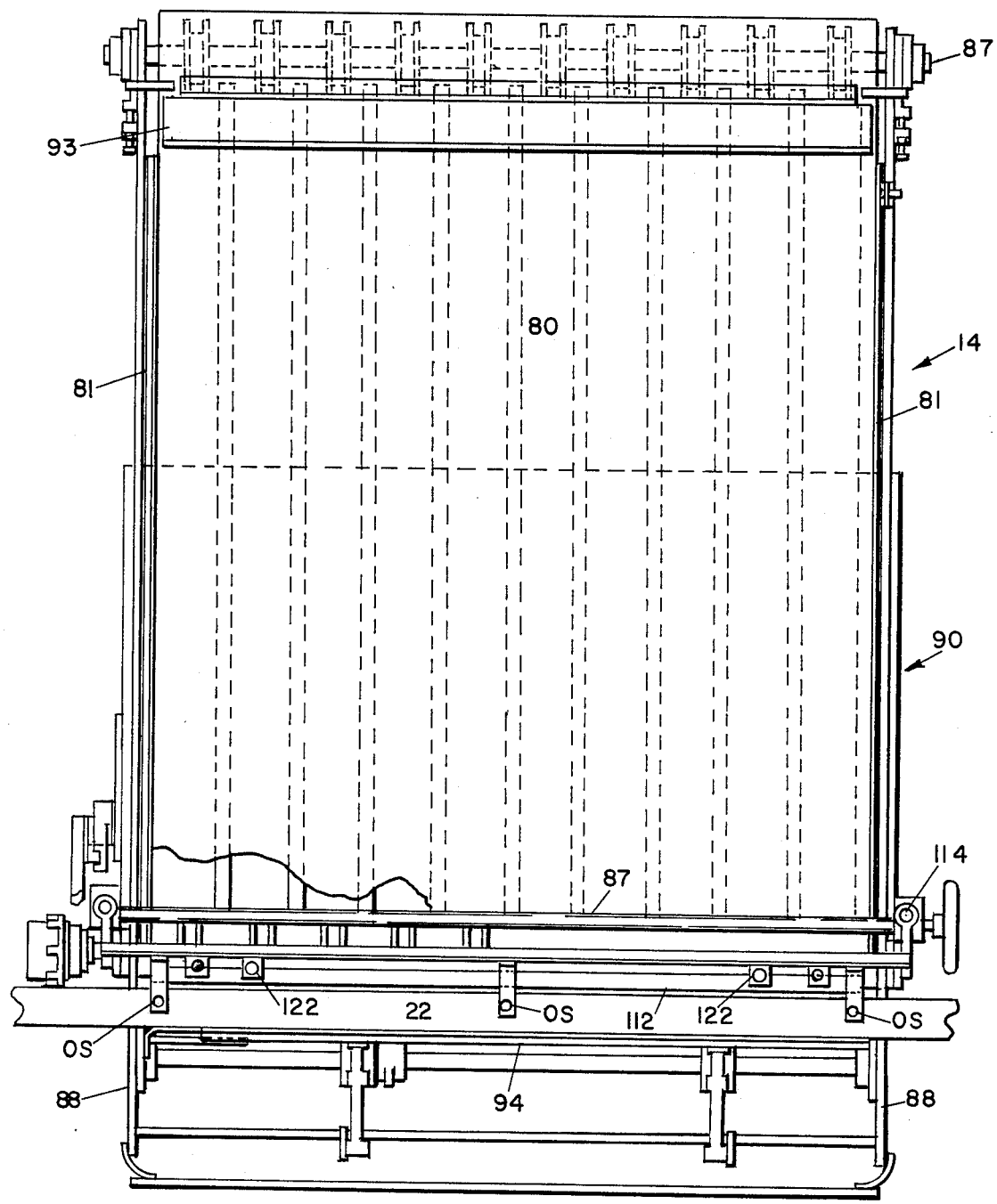
FIG. 2 is a plan view to larger scale of the accumulator with parts broken away.
Figure 6:
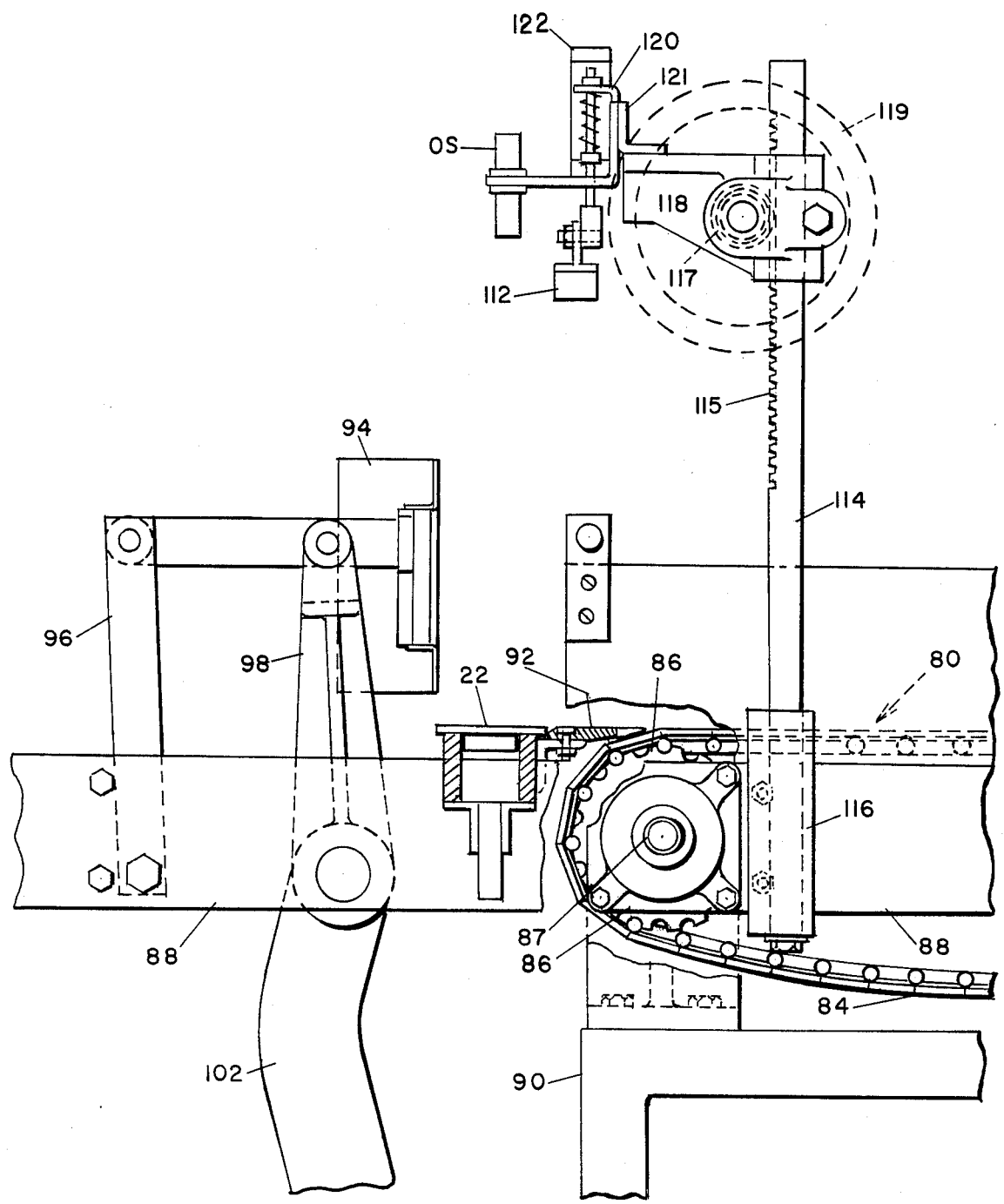
FIG. 6 is a fragmentary elevation as seen from the right-hand side of FIG. 2.
Figure 7:
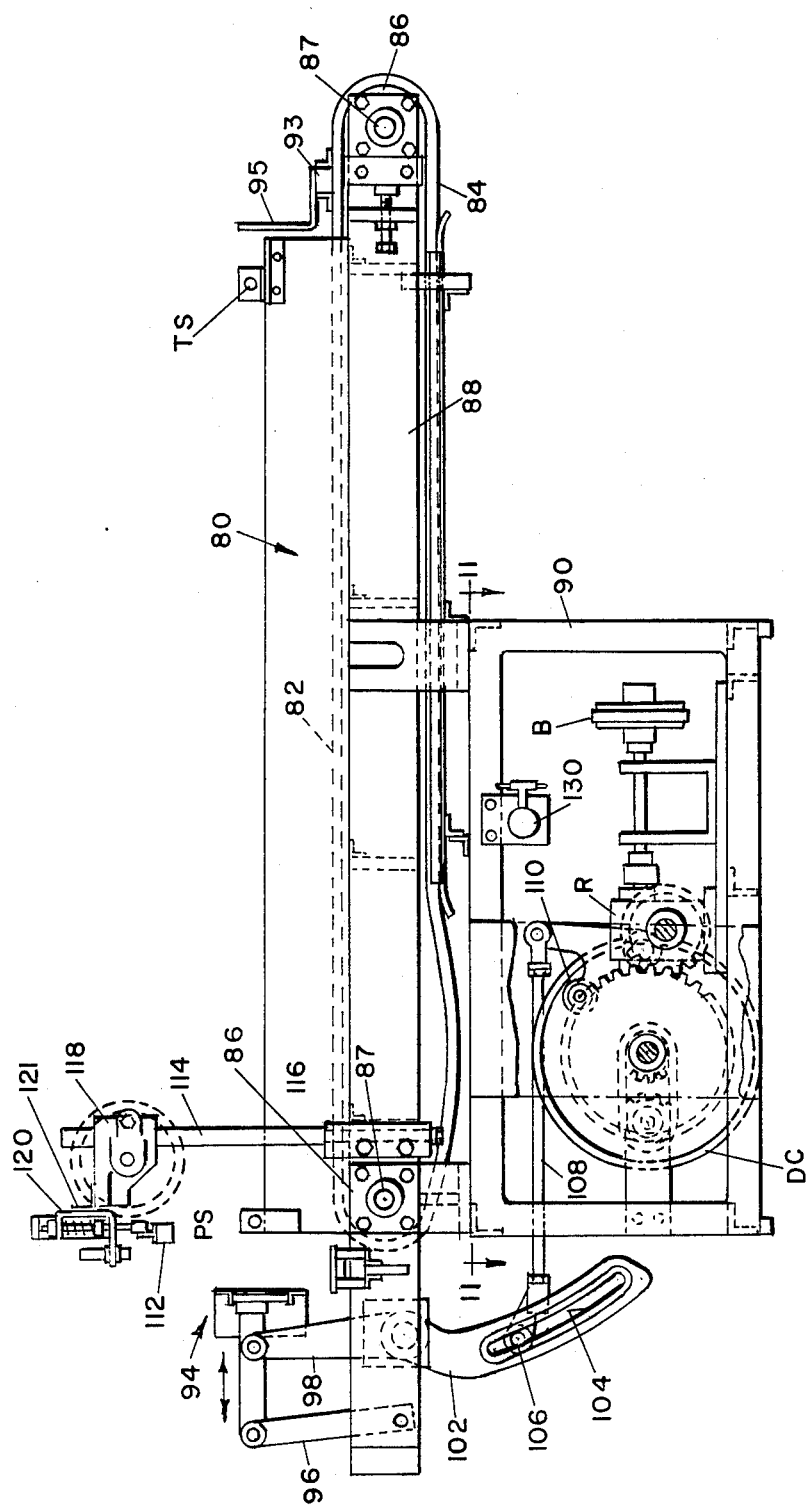
FIG. 7 is an elevation of the right-hand side of FIG. 2.

As previously stated, the accumulator 14 is positioned intermediate the ends of the conveyor belt 22 and comprises a belt 80, FIGS. 1, 2 and 7, having upper and lower runs 82 and 84 supported with the upper run in the plane of the conveyor belt 22 for movement relative to the conveyor belt 22 at right angles thereto. The accumulator belt 80 is entrained about sprockets 86—86, FIG. 7, fixed to the shafts 87—87, mounted to a frame 88 which, in turn, is mounted to a base 90. Retaining rails 81—81, FIG. 2, are provided along the opposite edges of the accumulator belt 80. The accumulator belt 80 is of a transverse width to receive a plurality of articles from the conveyor belt 22 and, for this purpose, there is provided at the end of the accumulator belt adjacent the conveyor belt 22 a horizontally-disposed dead plate 92, FIG. 6, disposed in the plane of the upper run of the conveyor belt 22. At the opposite side of the conveyor belt 22, there is a pusher bar 94, FIGS. 6 and 7, mounted to be reciprocated horizontally in a direction to move transversely of the conveyor belt 22.

Figure 10:
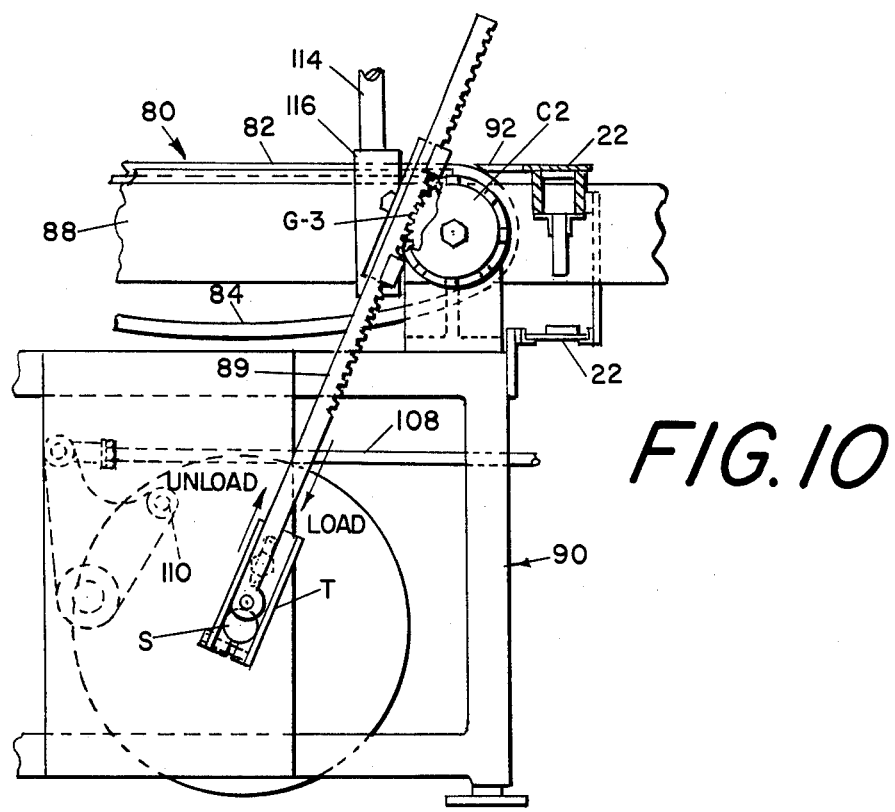
FIG. 10 is a fragmentary elevation from the left-hand side of FIG. 2.
Figure 11:
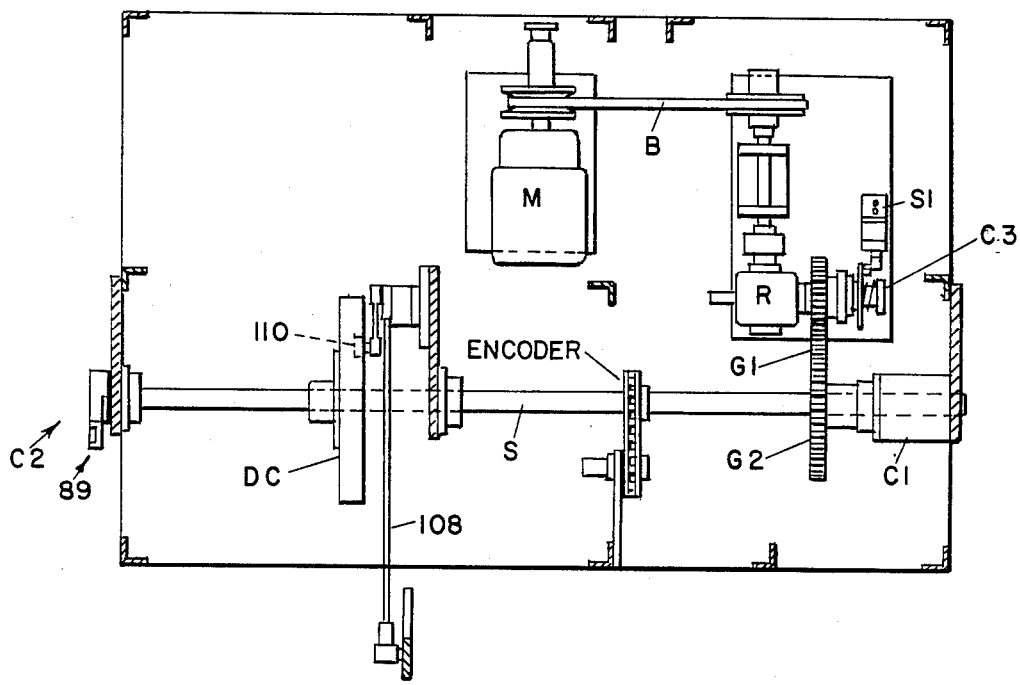
FIG. 11 is an elevation taken on the line 11—11 of FIG. 7.

The accumulator belt 80 is driven by a gear wheel G3, FIG. 10, mounted to an end of one of the sprocket shafts 87 which meshes with a rack bar 89 supported in engagement therewith. The rack bar 89 is reciprocal by a throw arm T fixed to the main drive shaft as will appear hereinafter. Reciprocation of the rack bar 89 will drive the sprocket shaft 87 to move the accumulator belt relative to the conveyor. There is a backup bar 93, FIG. 7, mounted to the accumulator belt for movement therewith to provide support for the articles on the accumulator belt as the latter is moved. The backup bar 93 is provided with a lip 95 which extends across the dead plate at the most forward position of the backup bar so as to clear the dead plate of articles. The stroke of the rack bar can be adjusted by adjustment of the throw arm T. Optionally, the accumulator belt can be moved in a direction away from the conveyor belt to transport articles away from the dead plate.

Reciprocal movement of the pusher bar 94 is designed to enable pushing articles from the conveyor belt 22 onto the dead plate 92 and to be retracted from the dead plate in conjunction with movement of the accumulator belt toward the conveyor belt to support the articles in stable equilibrium as they are moved by the accumulator belt onto the conveyor belt. As herein illustrated, FIGS. 6 and 7, the pusher bar 94 is mounted at the upper end of a pair of levers 96 and 98 pivoted at their lower ends to the frame 88, pivotal movement of which provides for rectilinear movement of the pusher bar 94. One of the arms 98 has secured thereto a drive lever 102 containing a slot 104 for receiving a trunion pin 106 at the forward end of a connecting rod 108 drivable by a follower 110 engaged with a cam DC fixed to the main drive shafts as will appear hereinafter so as to effect oscillation of the levers 96 and 98 and, hence, the pusher bar 94.

Desirably, the articles are clamped to the dead plate 92 after they have been pushed by the pusher bar 94 onto the dead plate and held clamped thereon until the next row of articles is pushed toward the dead plate, whereupon they are released for transfer to the accumulator belt. For clamping, there is provided a clamp bar 112, FIGS. 4, 6 and 7, mounted vertically above the dead plate on posts 114—114. The posts 114—114 are secured at their lower ends in bracket members 116—116 fixed to the frame 88. The clamp bar 112 is mounted to posts for vertical adjustment on bracket members 118—118. The bracket members 118—118 are vertically adjustable on the posts by rack and pinion means 115 and 117, FIG. 6. A hand wheel 119 provides for rotating the pinion. Desirably, the clamp bar 112 is yieldably mounted on brackets 120 mounted to a bar 121 secured at its opposite ends to the bracket members 118—118.

Movement of the clamp bar 112 into and out of engagement with the upper ends of the articles resting on the dead plate is correlated with movement of the pusher bar 94 in such a way that when the clamp bar 112 is elevated, the pusher bar is movable beneath it to push articles from the conveyor onto the dead plate and to then be retracted and the clamp bar lowered into clamping engagement during the loading operation and during the unloading operation so that the pusher bar 94 is moved into engagement with the articles on the dead plate prior to release of the articles by the clamp bar, whereupon the clamp bar is retracted and the pusher bar, in conjunction with the accumulator belt, moves the articles from the dead plate onto the conveyor belt.

Figure 3:
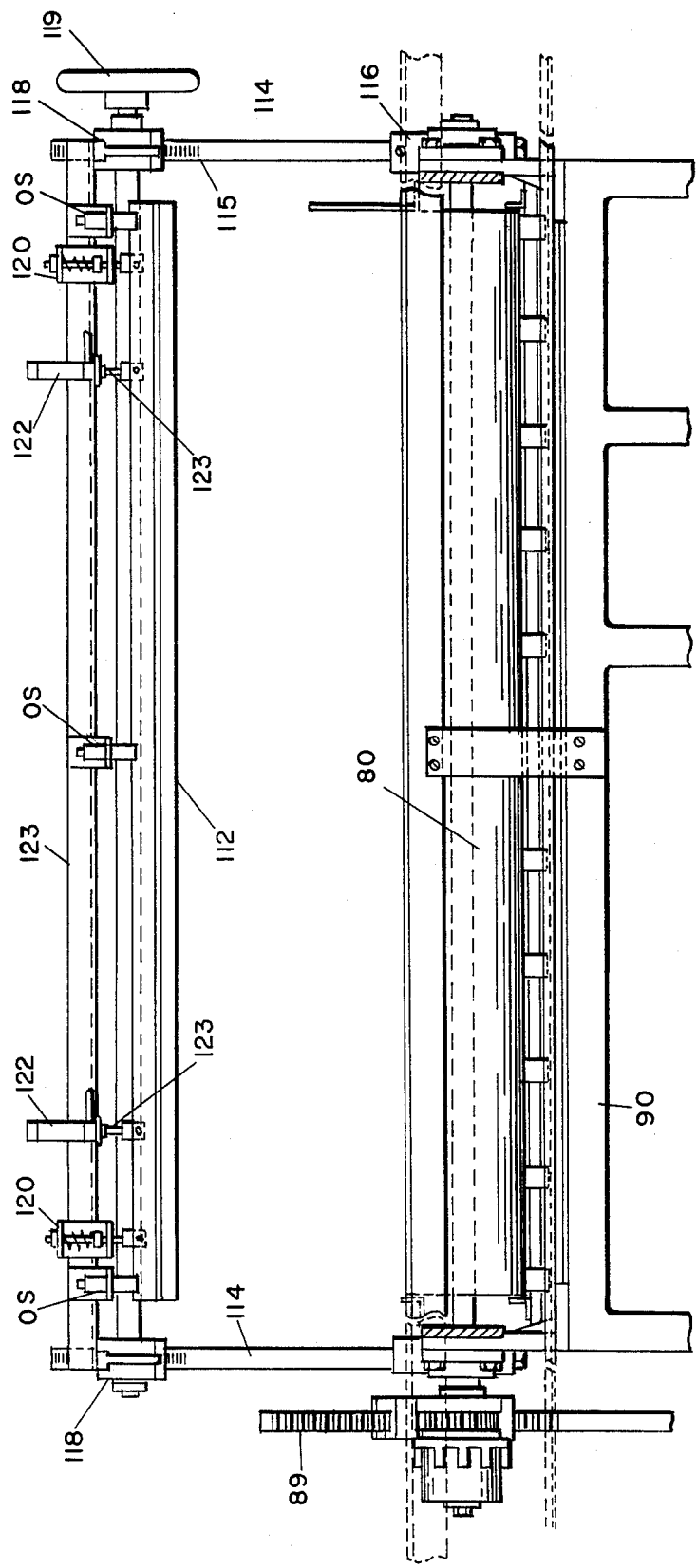
FIG. 3 is a front elevation of the accumulator.

Vertical movement of the clamp bar 112 is effected by pnuematic cylinders 122 provided with rods 123, FIG. 3, to the lower ends of which is connected the clamp bar. Solenoid valves 130, FIG. 3, are provided to supply pressure to the cylinder 112 at appropriate times.

During normal operation of the apparatus thus far described, the conveyor belt 22 moves continously and carries articles from filling apparatus at the upstream side of the accumulator to the downstream side. If there is no blockage of articles downstream of the accumulator, the latter remains inoperative. The articles travel along on the conveyor and the star wheels 62 and 64 merely rotate freely in response to the passage of articles.

As has been previously mentioned, the purpose of the accumulator is to store articles temporarily if the conveyor belt downstream of the accumulator becomes blocked and to restore the articles to the conveyor belt when the latter becomes unblocked. For this purpose, there is provided a series of sensors and control means which will now be described.

Referring to FIG. 1, there is shown downstream of the accumulator two sensors LS and US which are, respectively, a load sensor and an unload sensor. These sensors are linearly spaced by a distance corresponding to approximately the width of the accumulator belt. At the upstream and downstream sides of the accumulator at opposite sides of the conveyor belt, there are sensors DS—DS arranged to scan the portion of the conveyor belt confronting the accumulator and to this end, are positioned diagonally at opposite sides of the conveyor belt. Above the conveyor belt, there are supported on the bar 112, FIG. 3, three longitudinally-spaced sensors OS so located as to scan the upper surface of the conveyor belt confronting the accumulator. Finally, there is a sensor PS. FIG. 7, supported above the dead plate at one end to scan the length of the dead plate. The aforesaid sensors, in conjunction, provide for loading and unloading articles to and from the accumulator belt as a result of backup on the conveyor belt and clearance of articles on the conveyor belt. The circuitry within which the aforesaid sensors are connected under normal conditions, that is, when articles are passing freely along the conveyor from one end toward the other end, is inoperative. In the event, however, that articles become blocked at the downstream side of the accumulator to the extent that both the sensors LS and US become blocked by the presence of articles with no gaps therebetween, the latter, that is, the sensor LS, will generate a signal which will lock the gate 64 at the downstream side of the accumulator. At this point, the sensor US is also blocked and the intake gate 62 at the upstream side of the accumulator is unlocked. Also at this point, the sensor PS remains inoperative and the sensors DS—DS remain inoperative. When the gate 64 locks and articles back up against the gate 64, they obstruct the three sensors OS successively and when the last one is obstructed, indicating a solid line of articles backed up against the gate 64, a signal is generated which raises the stabilizer bar 112 to a sufficient height to enable articles to be moved from the conveyor belt 22 onto the dead plate 92, whereupon the pusher bar 94 moves transversely of the conveyor belt so as to push articles onto the dead plate. Simultaneously, the accumulator belt 80 indexes in a direction away from the dead plate to carry away articles previously pushed onto the dead plate, if there were such articles present, the stabilizer bar descends and the pusher bar retracts. This sequence of events will continue so long as the gate 64 remains locked and articles stack up against the gate sufficiently to block all three sensors OS.

If now the sensor LS is cleared, gate 64 unlocks, allowing resumption of movement of the articles downstream of the accumulator and if the articles traveling past are at a predetermined spacing, the sensor US generates a signal to lock the intake gate 62. Since the discharge gate 64 is unlocked, the conveyor belt moves the articles thereon downstream of the accumulator, and when the sensors DS—DS indicate the absence of articles confronting the accumulator, a signal is generated to move the pusher bar 94 into engagement with the line of articles on the dead plate and thereafter raise the stabilizer bar 113, index the accumulator belt toward the conveyor belt and retract the pusher plate so as to transfer another row of articles from the dead plate onto the conveyor. The gate 62 now unlocks and the articles on the conveyor and those upstream of the accumulator move to the downstream side of the accumulator. When the sensor US sees spaces between articles corresponding to said predetermined spacing, the aforesaid steps are repeated to transfer the next line of articles from the accumulator belt to the conveyor belt. When all of the articles have been retransferred from the accumulator belt to the conveyor belt, the dead plate sensor PS will abort operation of unloading the accumulator and the apparatus will continue its normal operation in which the accumulator remains idle until the sensor LS again indicates a backup.

In the event that the blockage is for a prolonged period of time so that the accumulator belt becomes completely filled, there is provided a sensor TS, FIG. 7, for terminating the loading operation.

The drive for the pusher bar 94 and accumulator belt 80 comprises, as shown diagrammatically in FIGS. 10, 11, 12 and 13, a drive shaft S, rotation of which is effected by a motor M by way of a belt B, a gear reducer R, a pair of meshing gears G1 and G2 and a clutch C1, operation of which on the one hand allows the gear G2 to turn freely on the shaft S and on the other hand fixes the gear G2 to the shaft S. The drive shaft S has fixed to it the drive cam DC with which a follower 110 is engaged. Rotation of the drive cam DC, accordingly, effects reciprocation of the pusher bar 94. The drive shaft S also has fixed to it a throw arm T, FIG. 10, to which is pivotally connected one end of the rack bar 89. The other end of the rack bar 89 is held engaged with a gear G3 mounted to the shaft 87 and a clutch C2 provides for on the one hand fixing the gear G3 to the shaft 87 and on the other hand releasing it therefrom. Thus, rotation of the drive shaft by way of the throw arm T effects rotation of the shaft 87. A safety clutch C3 is provided to release the gear G1 on the output shaft of the gear reducer in the event of an excessive load, operable when actuated to open a switch S1 to stop the machine.

Appropriate circuitry is provided for correlating the operation of the aforesaid sensing devices, clutches, and air cylinders to achieve the desired results. Its details are not specifically related herein since it is conventional in its composition.

It should be understood that the present disclosure is for the purpose of illustration only and includes all modifications or improvements which fall within the scope of the appended claims.

What is claimed is:

1. Apparatus for transporting articles comprising a first conveyor defining a horizontal supporting surface movable along a predetermined path for transferring articles in single file along said path, an accumulator arranged adjacent said first conveyor comprising a second conveyor defining a horizontal supporting surface in the plane of the supporting surface of the first conveyor with one end adjacent but spaced from the first conveyor and the other end remote therefrom, the supporting surfaces of said second conveyor being movable toward and away from the supporting surface of the first conveyor, a dead plate disposed between the first and second conveyors having a supporting surface in the plane of the supporting surfaces of the first and second conveyors, a stabilizer bar mounted above the dead plate for vertical movement up and down relative to the dead plate for clamping articles moved onto the dead plate to the dead plate, a pusher bar disposed at the side of the first conveyor opposite the second conveyor for reciprocal movement transversely of the first conveyor to a position adjacent the dead plate to move articles from the first conveyor onto the dead plate, a backup bar disposed above the second conveyor at the side of the dead plate remote from the first conveyor movable in one direction of movement with the second conveyor to stabilize containers on the second conveyor following elevation of the statilizing bar from the tops of the containers to release the containers for movement as the containers are moved from the dead plate onto said second conveyor and in an opposite direction with the second conveyor to displace the containers resting on the dead plate from the dead plate onto the first conveyor, and means for sequencing movement of the pusher bar, stabilizer bar, second conveyor and backup bar such that the transfer of articles from the first conveyor to the dead plate is effected by elevation of the stabilizer bar and movement of the pusher bar transversely of the first conveyor to push the articles from the first conveyor onto the dead plate into engagement with the backup bar, followed by lowering of the stabilizer bar into engagement with the articles pushed onto the dead plate into engagement with the backup bar and retraction of the pusher bar and displacement of the articles from the second conveyor is effected by movement of the second conveyor and backup bar into engagement with the articles held clamped to the dead plate by the stabilizer bar, followed by elevation of the stabilizer bar and movement of the second conveyor and backup bar in consonance to transfer the articles from the dead plate onto the first conveyor and control circuitry for sequencing operation of the pusher bar, stabilizer bar, backup bar and second conveyor to effect transfer and retransfer as a consequence of backup of articles downstream of the accumulator and clearance of the articles downstream of the accumulator.

2. Apparatus according to claim 1 wherein there are guide rails positioned at opposite sides of the first conveyor upstream and downstream of the accumulator and means supporting the guide rails for vertical adjustment relative to the plane of the first conveyor.

3. Apparatus according to claim 1 wherein the pusher bar corresponds substantially in length to the width of the accumulator and is supported at a level above the accumulator for rectilinear movement transversely of the conveyor.

4. Apparatus according to claim 1 wherein there are gates mounted adjacent the upstream and downstream sides of the accumulator above the plane of the first conveyor provided with radial blades dimensioned to extend transversely of the first conveyor.

5. Apparatus according to claim 1 wherein there is means for driving the first conveyor at a speed such that articles delivered thereto upstream of the accumulator are spaced at a predetermined distance from each other on the first conveyor as they are transported thereby.

6. Apparatus according to claim 1 wherein the first conveyor clears itself of articles transferred to it by the accumulator at a rate faster than the accumulator operates to effect such transfer.

7. Apparatus according to claim 1 wherein the back stop is mounted to the accumulator and movable therewith for stabilizing articles moved from the dead plate onto the accumulator.

8. Apparatus according to claim 7 wherein the back stop is movable forwardly with the accumulator as the latter is indexed toward the first conveyor and embodies a lip which extends forwardly therefrom at the forward extremity of its forward movement across the dead plate.

9. Apparatus according to claim 4 comprising first and second sensors downstream of the accumulator belt operable when blocked by articles downstream of the accumulator to lock the gate at the downstream side, third sensors operable when blocked by articles backed up on the conveyor against the locked gate to sequentially elevate the stabilizer bar, move the pusher bar transversely of the conveyor to transfer articles backed up against the locked gate from the convyor to the dead plate and thereafter to lower the stabilizer bar into engagement with the articles transferred to the dead plate and retract the pusher bar, said circuitry being operable to repeat said sequence so long as articles block the first sensor.

10. Apparatus according to claim 1 wherein there is a common drive shaft for effecting operation of the pusher bar and the accumulator, a drive motor, a gear reducer driven by the drive motor, a pair of meshing gears, one of which is driven by the gear reducer and the other of which is mounted to the common drive shaft and a clutch operable to drivably fix the gear mounted to the drive shaft thereon for effecting rotation of the drive shaft.

* * * * *